United States Patent
Salleh et al.

(10) Patent No.: US 12,159,658 B1
(45) Date of Patent: Dec. 3, 2024

(54) CHAMFER FORMATION ON DATA STORAGE DISC SUBSTRATES

(71) Applicant: Seagate Technology LLC, Fremont, CA (US)

(72) Inventors: Sideq Bin Salleh, Johor (MY); Mohd Arobi Bin Awang, Johor (MY); Gary Anak Kelunie, Johor (MY)

(73) Assignee: Seagate Technology, LLC, Fremont, CA (US)

( * ) Notice: Subject to any disclaimer, the term of this patent is extended or adjusted under 35 U.S.C. 154(b) by 569 days.

(21) Appl. No.: 17/496,346

(22) Filed: Oct. 7, 2021

(51) Int. Cl.
*G11B 5/84* (2006.01)
*B24B 9/06* (2006.01)
*B24B 9/10* (2006.01)

(52) U.S. Cl.
CPC .......... *G11B 5/8404* (2013.01); *B24B 9/065* (2013.01); *B24B 9/107* (2013.01)

(58) Field of Classification Search
None
See application file for complete search history.

(56) References Cited

U.S. PATENT DOCUMENTS

| | | | |
|---|---|---|---|
| 5,074,079 A | 12/1991 | Park | |
| 5,097,630 A * | 3/1992 | Maeda | B24B 9/065 451/143 |
| 5,265,382 A | 11/1993 | Park | |
| 5,327,686 A | 7/1994 | Park | |
| 5,433,652 A | 7/1995 | Park | |
| 7,798,889 B2 | 9/2010 | Nakiri et al. | |
| 8,016,645 B2 | 9/2011 | Nakiri et al. | |
| 2009/0042493 A1 | 2/2009 | Nakiri et al. | |
| 2010/0317265 A1 | 12/2010 | Nakiri et al. | |
| 2011/0294406 A1* | 12/2011 | An | B24B 37/02 451/259 |
| 2015/0283664 A1 | 10/2015 | Kato et al. | |

FOREIGN PATENT DOCUMENTS

| | | |
|---|---|---|
| JP | 2003231044 A | 8/2003 |
| JP | 5020603 B2 | 9/2012 |
| JP | 5074311 B2 | 11/2012 |

* cited by examiner

*Primary Examiner* — Roberts P Culbert
(74) *Attorney, Agent, or Firm* — Westman, Champlin & Koehler, P.A.

(57) ABSTRACT

A method includes partially forming a top chamfer on a disc substrate with a first brush, and partially forming a bottom chamfer on the disc substrate with a second brush. The method also includes completing the formation of the bottom chamfer with the first brush, and completing the formation of the top chamfer with the second brush.

14 Claims, 6 Drawing Sheets

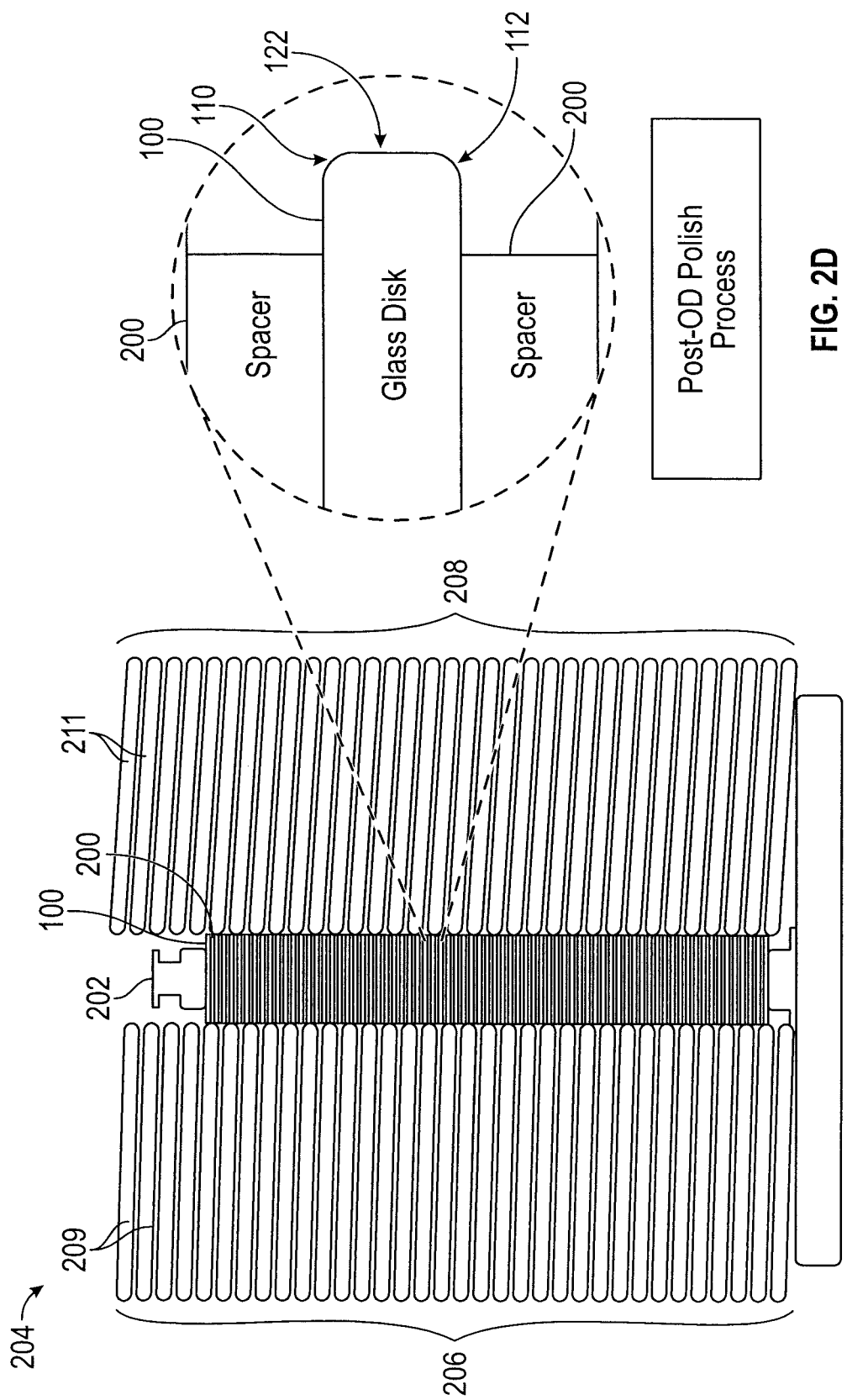

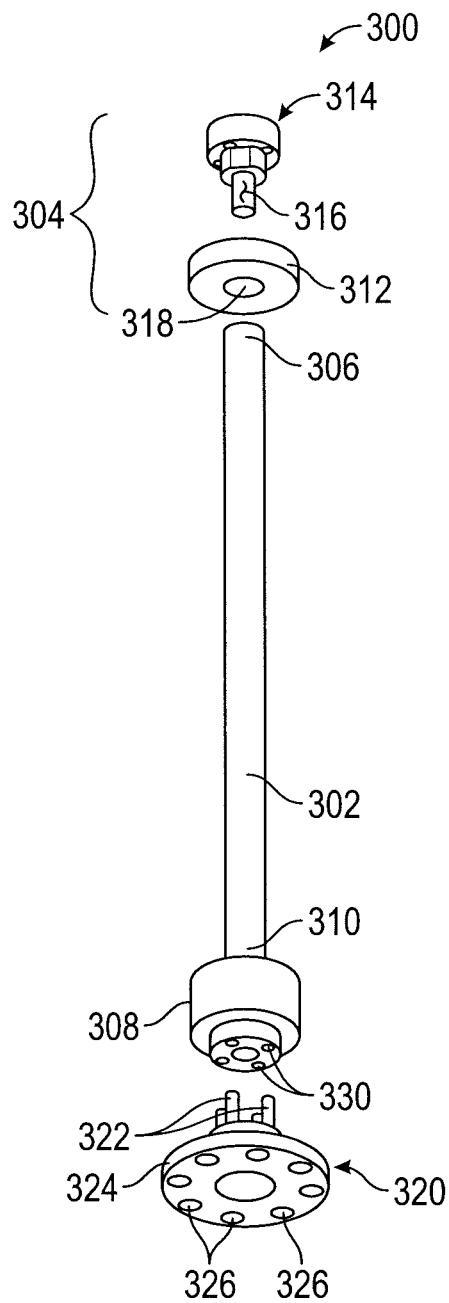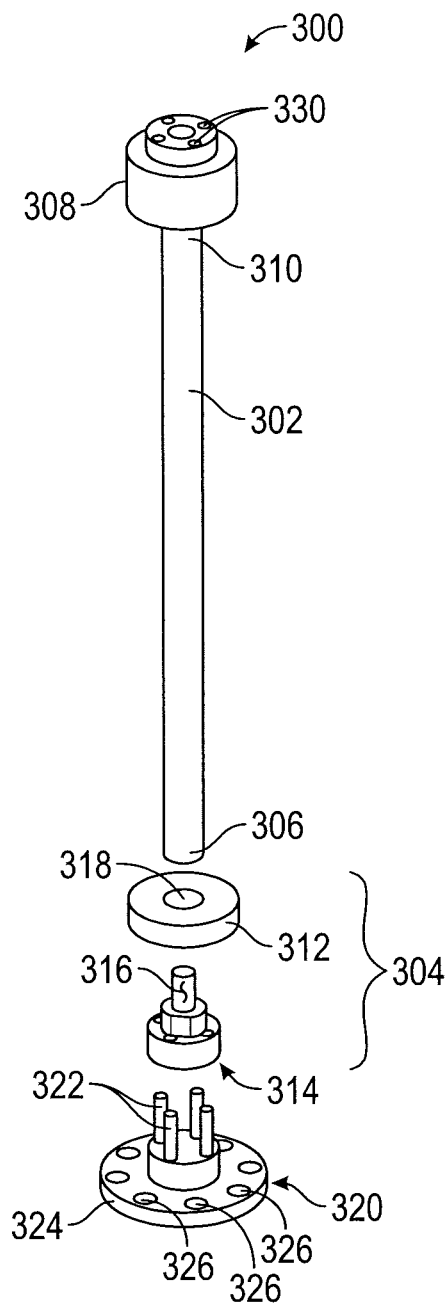
FIG. 3A    FIG. 3B
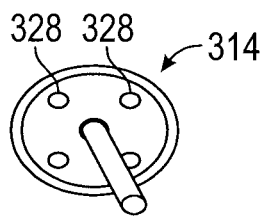
FIG. 3C

CHAMFER FORMATION ON DATA STORAGE DISC SUBSTRATES

SUMMARY

In one embodiment, a method is provided. The method includes coupling a bottom end of a two-way pole with a plurality of disc substrates mounted thereon to a base connected to a substrate polishing machine. The method also includes partially forming a top chamfer on each disc substrate of the plurality of disc substrates with a first brush of the substrate polishing machine, and partially forming a bottom chamfer on each disc substrate of the plurality of disc substrates with a second brush of the substrate polishing machine. After the top and bottom chamfers are partially formed, with positions of the first and second brush remaining unchanged, the bottom end of the two-way pole is disconnected from the base, and a top end of the two way pole is connected to the base, thereby flipping the plurality of disc substrates. This enables the bottom chamfers to be completed by the first brush and the top chamfers to be completed by the second brush.

In another embodiment, an apparatus is provided. The apparatus includes a two-way pole. The two-way pole includes a mounting pole configured to receive a plurality of disc substrates, a top end piece attachable to a top end of the mounting pole, and a bottom end piece attachable to a bottom end of the mounting pole. The apparatus further includes a base. The top end piece and the bottom end piece of the two-way pole are configured to releasably couple to the base.

In yet another embodiment, a method is provided. The method includes partially forming a top chamfer on a disc substrate with a first brush, and partially forming a bottom chamfer on the disc substrate with a second brush. The method also includes completing the formation of the bottom chamfer with the first brush, and completing the formation of the top chamfer with the second brush.

This summary is not intended to describe each disclosed embodiment or every implementation of the chamfer formation on data storage disc substrates. Many other novel advantages, features, and relationships will become apparent as this description proceeds. The figures and the description that follow more particularly exemplify illustrative embodiments.

BRIEF DESCRIPTION OF THE DRAWINGS

FIG. 2C is a diagrammatic illustration of a pole with disc substrates and spacers mounted on/coupled to a disc substrate polishing machine.

FIG. 2D is an enlarged view of a portion of the disc substrate-spacer stack shown in FIG. 2C after chamfer formation on the disc substrate.

FIGS. 3A and 3B are diagrammatic illustrations of a two-way pole in accordance with an embodiment of the disclosure.

FIG. 3C is a diagrammatic illustration of a top cap of the two-way pole of FIGS. 3A and 3B.

DETAILED DESCRIPTION

Figure 1A:
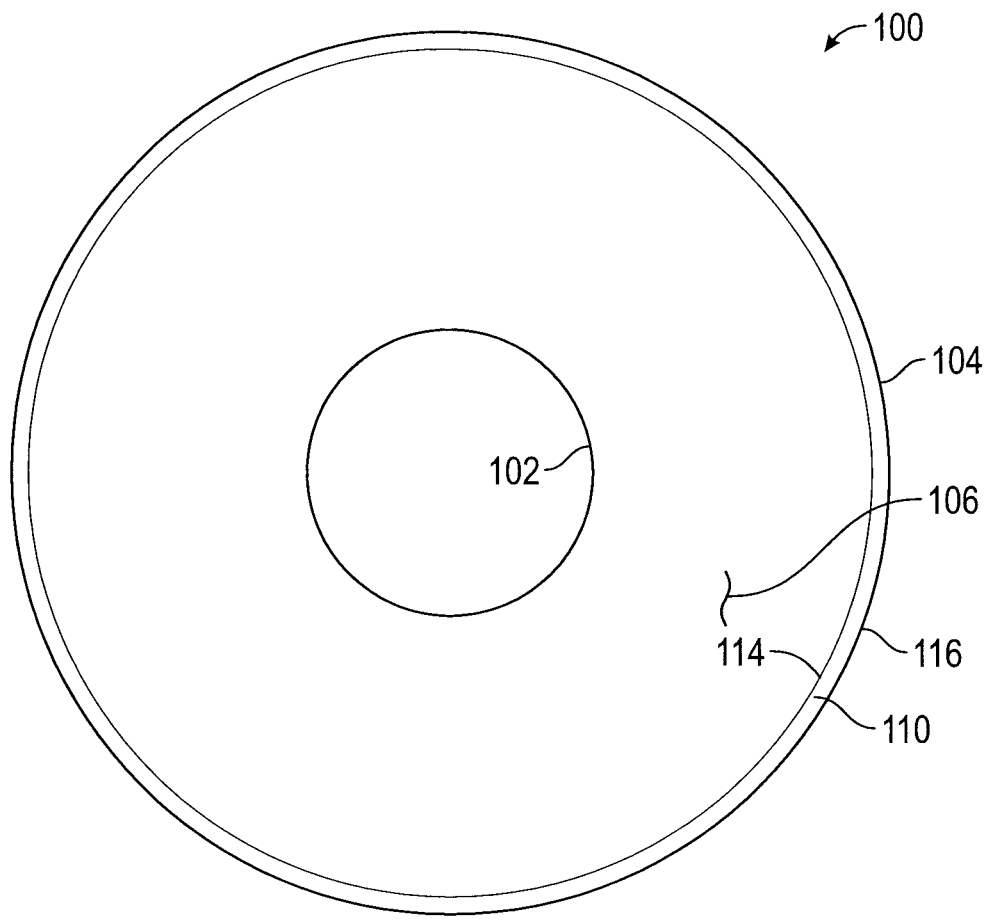
FIG. 1A is a top view of a data storage disc substrate having chamfers.

Embodiments of the disclosure relate to chamfer formation on data storage disc substrates.

Data storage devices such as hard disc drives (HDDs) employ data storage discs (e.g., magnetic discs) to store information. The magnetic discs are formed by coating substrates (e.g., glass substrates) with magnetic material.

A glass substrate is formed in a disc shape having a circular hole in the center, but edges of the glass substrate may be chipped during handling due to internal stress. Therefore, peripheral end surfaces of the glass substrate are chamfered to smooth the disc edges. As will be described in further detail below, current chamfer formation processes may produce chamfers on upper and lower surfaces of the disc substrate that have differing slopes and other imbalances. Embodiments of the disclosure provide a chamfer formation process that reduces or eliminates such imbalances. Prior to providing details regarding the different embodiments, a disc substrate with chamfers is briefly described below in connection with FIGS. 1A and 1B.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Figure 1B:
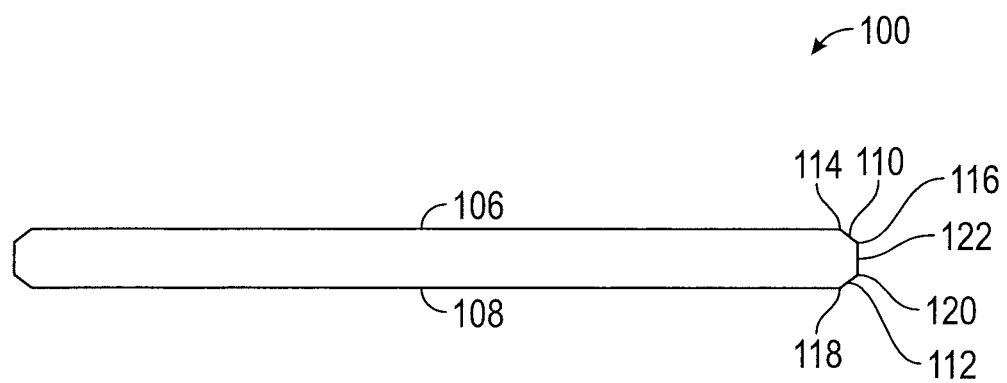
FIG. 1B is a side view of the data storage disc substrate of FIG. 1A.

FIGS. 1A and 1B are top and side views, respectively, of a data storage disc substrate 100 having chamfers. As a non-limiting example, substrate 100 may be a glass substrate. In general, substrate 100 may be formed of any suitable material. In one embodiment, disc substrate 100 is about 0.55 millimeters (mm) thick. Substrate 100 has an inner diameter (ID) 102, an outer diameter (OD) 104, a top surface 106, and a bottom surface 108. Peripheral ends of top surface 106 and bottom surface 108 include chamfers 110 and 112, respectively. Top chamfer 110 has a first edge 114 and a second edge 116, and bottom chamfer 112 has a first edge 118 and a second edge 120. A flat outer edge 122 is between second edge 116 of top chamfer 110 and second edge 120 of bottom chamfer 112.

Figures 2A, 2B:
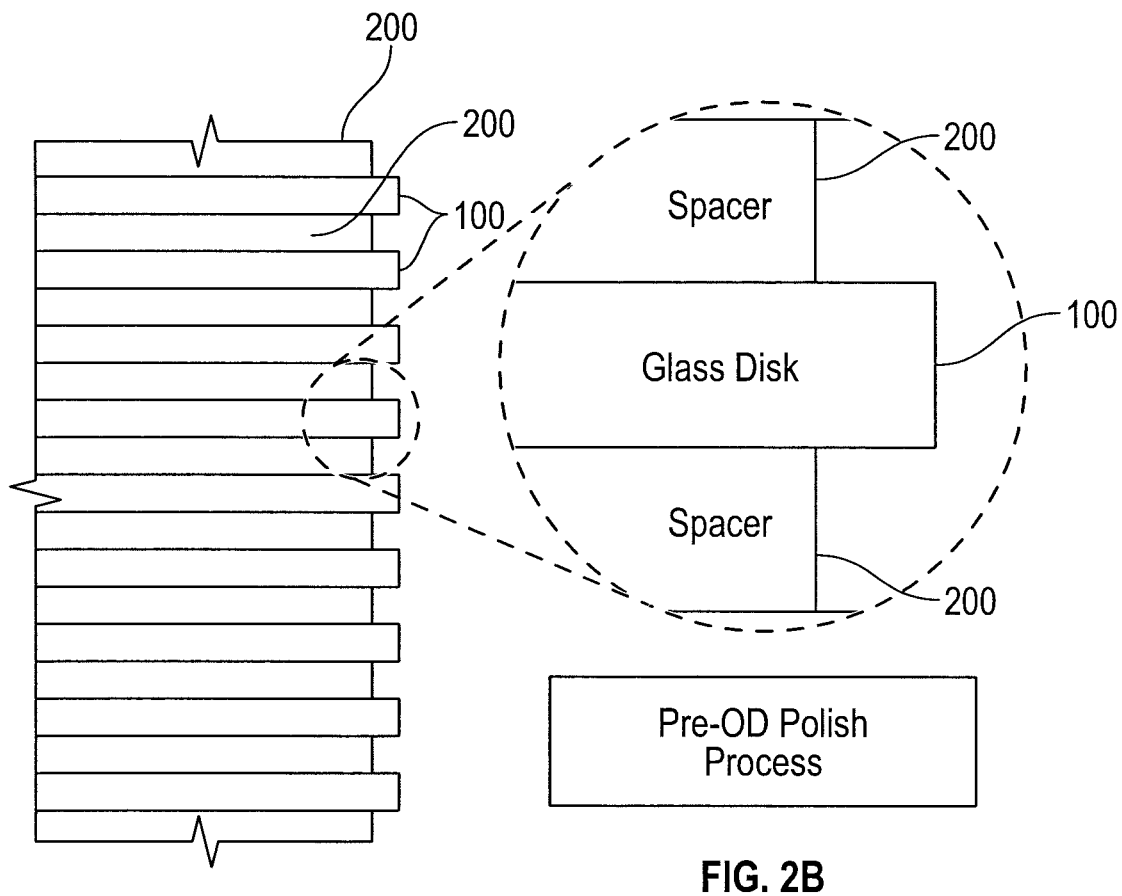
FIG. 2A is a diagrammatic illustration of a portion of a disc substrate-spacer stack.
FIG. 2B is an enlarged view of a portion of the disc substrate-spacer stack shown in FIG. 2A before chamfer formation on the disc substrate.

Top 110 and bottom 112 chamfers are formed during disc substrate 100 outer edge 122 polishing. To perform the outer edge 122 polishing, a large number (e.g., 200) of disc substrates such as 100 of FIGS. 1A and 1B are mounted on a pole along with spacers in between the disc substrates 100. FIG. 2A shows a portion of the large number of disc substrates 100 with spacers 200 between the disc substrates 100. FIG. 2B is an enlarged view that shows a single disc substrate 100 portion and spacer 200 portions before polishing is carried out with the help of brushes, which are described below in connection with FIG. 2C. To enable chamfer formation by brushes, spacer 200 may have a slightly smaller diameter than disc substrate 100. For example, disc substrate 100 may have a diameter of about 97 mm and spacer 200 may have a diameter of about 94 mm. The size difference between the disc substrates 100 and the spacers 200 enables outer edges of the brushes to fit between the disc substrates 100 to form the chamfers such as 110 and 112.

FIG. 2C is a diagrammatic illustration of a pole 202 with disc substrates 100 and spacers 200 mounted on/coupled to a disc substrate polishing machine 204 that includes a first brush 206 to the left of the disc substrates 100, and a second brush 208 to the right of the disc substrates 100. In the configuration shown in FIG. 2C, polishing is carried out with the brushes 206 and 208 that move spirally, such that the first brush 206 forms the top chamfers 110 on the disc substrates 100 and the second brush 208 forms the bottom chamfers 112 on the disc substrates 100. In one embodiment, brushes 206 and 208 are configured as screws or angular screws (e.g., bristles 209 and 211 of brushes 206 and 208, respectively, are arranged like threads of a screw). When brushes 206 and 208 are rotated, bristles 209 and 211 move spirally. It should be noted that pole 202 with the disc substrates 100 and spacers 200 may also be rotated during polishing to enable the chamfers and 110 and 112 to be formed on the entire disc substrate outer edges. In one embodiment, during polishing, brushes 206 and 208 are rotated clockwise (e.g., at 300-500 rotations per minute (RPM)) and pole 202 with disc substrates 100 and spacers 200 is rotated anti-clockwise (e.g., at 30-50 RPM) to form chamfers 110 and 112, respectively. Chamfers 110 and 112 formed on a single disc substrate 100 are shown in the enlarged view of FIG. 2D.

Prolonged usage of the brushes such as 206 and 208 causes brush wear, which may result in differences between the first 206 and second 208 brushes. This, in turn, may produce an imbalance between the top 110 and bottom 112 chamfers.

To address potential chamfer 110, 112 imbalance problems, embodiments of the disclosure employ a two-way pole (e.g., a pole whose upper and lower ends are configured to releasably couple to a disc substrate polishing machine such as 204), which enables the whole disc substrate 100-spacer 200 stack to be flipped, for example, halfway through the polishing process. Flipping the disc substrate 100-spacer 200 stack halfway through the polishing process cancels out any impact of mechanical imbalances between the first 206 and second 208 brushes, thereby resulting in matching (or substantially matching) top 110 and bottom 112 chamfers.

The design of the two-way pole and the flip process, which can be carried out without unloading the disc substrate-spacer stack to flip the whole stack, are aspects of the disclosure that are described below in connection with FIGS. 3A-5.

FIGS. 3A and 3B are diagrammatic illustrations of a two-way pole 300 that includes upper and lower ends that are releasably connectable to a base in accordance with an embodiment of the disclosure. Referring to FIG. 3A, pole 300 includes a mounting pole 302, which is configured to receive disc substrates 100 (shown in FIGS. 2A-2D) and spacers 200 (shown in FIGS. 2A-2D). Two-way pole 300 also includes a top/upper end piece 304 that is releasably attachable to a top end 306 of the mounting pole 302. Two-way pole 300 further includes a bottom/lower end piece 308 that is attachable/attached to a bottom end 310 of the mounting pole 302.

With bottom end piece 308 attached to mounting pole 302 and top end piece 304 separated/detached from mounting pole 302, disc substrates 100 and spacers 200 are alternately introduced from over the top end 306 of the mounting pole 302, such that a disc substrate 100-spacer 200 stack is formed as shown in FIG. 2A. Once all the disc substrates 100 and spacers 200 are alternately stacked, a top clamp 312 of top end piece 304 is placed over the disc substrate 100-spacer 200 stack. Thereafter, a top lock 314 is connected to the top end 306 of the mounting pole 302 to hold the top clamp 312, disc substrates 100, and spacers 200 in place. In one embodiment, top lock 314 includes a screw 316 that is introduced into a hole 318 in top clamp 312 and into a threaded groove (not shown) at top end 306 of mounting pole 302, and tightened to hold the assembly in place. In general, top lock 314 may include any suitable fastener that enables the top lock 314 to hold the top clamp 312, disc substrates 100 and spacers 200 in place.

As indicated above, top end piece 304 and bottom end piece 308 are releasably connectable to a base. The base is denoted by reference numeral 320 in FIGS. 3A and 3B. Base 320 includes a plurality of pins 322 that extend in an upward direction from a bottom portion 324. In some embodiments, the bottom portion 324 of base 320 includes a plurality of holes 326 that may be utilized for receiving fasteners (not shown) to couple base 320 to a substrate polishing machine such as 204 of FIG. 2C.

To enable the releasable coupling of the top end piece 304 and bottom end piece 308 to base 320, top end piece 304 and bottom end piece 308 include holes 328 and 330, respectively, which are sized to receive pins 322. In one embodiment, holes 328 are included in top lock 314 of top end piece 304 as shown in FIG. 3C.

In one embodiment, the two-way pole 300 and the base 320 are formed of a metal (e.g., stainless steel). In other embodiments, the two-way pole 300 may and base 320 may be formed of plastic or any other suitable material. In certain embodiments, different portions of two-way pole 300 and base 320 may be formed of different materials.

It should be noted that a portion of the substrate polishing machine 204 of FIG. 2C to which the base 320 is coupled is rotatable to enable rotation of the base 320 along with the attached two-way pole 300 during disc substrate 100 polishing. Thus, the entire assembly (base 320 and two-way pole 300 with disc substrates 100 and spacers 200) is rotatable by substrate polishing machine 204 in the connection configurations shown in both FIGS. 3A and 3B.

Figure 4:
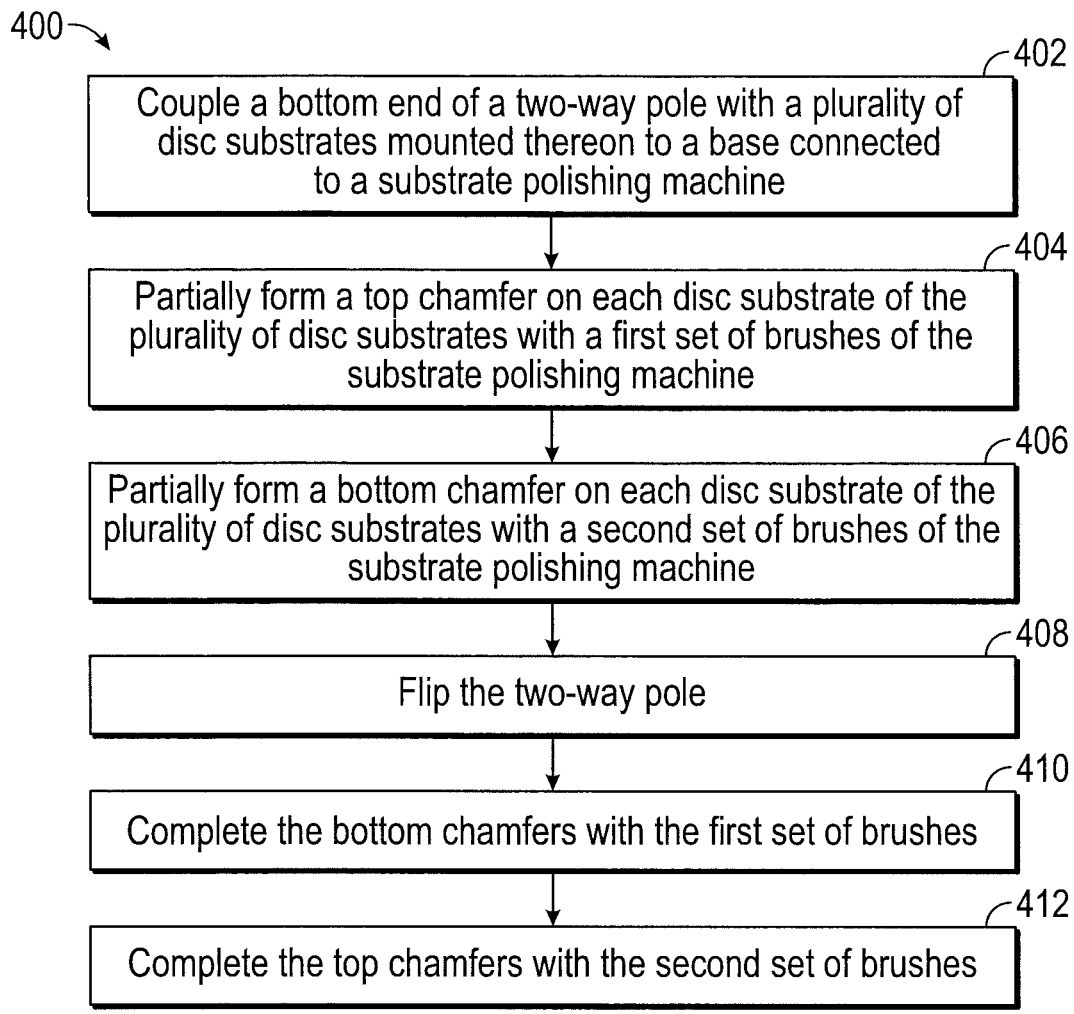
FIG. 4 is a flowchart of a first method embodiment.

FIG. 4 is a flowchart of a method 400 of forming chamfers (such as 110 and 112 of FIGS. 1A and 1B) on disc substrates by employing a two-way pole (such as 300 of FIGS. 3A and 3B) in accordance with an embodiment of the disclosure. At 402, a bottom end of a two-way pole with a plurality of disc substrates mounted thereon is coupled to a base connected to a substrate polishing machine. At 404, a top chamfer is partially formed on each disc substrate of the plurality of disc substrates with a first brush of the substrate polishing machine. At 406, a bottom chamfer is partially formed on each disc substrate of the plurality of disc substrates with a second brush of the substrate polishing machine. In some embodiments, 404 and 406 may be carried out simultaneously. At 408, with positions of the first and second brushes remaining unchanged, the bottom end of the two-way pole is disconnected from the base, and a top end of the two way pole is connected to the base, thereby flipping the plurality of disc substrates. At 410, the bottom chamfers are completed by the first brush. At 412, the top chamfers are completed by the second brush. In some embodiments, 410 and 412 may be carried out simultaneously.

Figure 5:
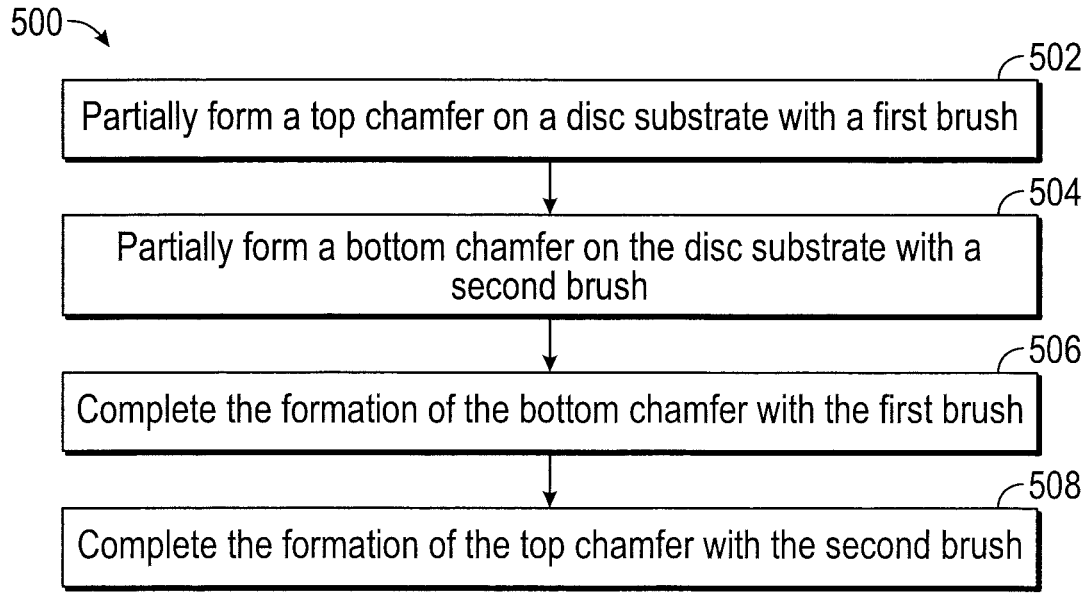
FIG. 5 is a flowchart of a second method embodiment.

FIG. 5 is a flowchart of a method 500 of forming chamfers on disc substrates in accordance with another embodiment. The method 500 may be carried out using any suitable apparatus that includes brushes for forming the chamfers. At 502, a top chamfer is formed on a disc substrate with a first brush. At 504, a bottom chamfer is formed on the disc substrate with a second brush. At 506, the formation of the bottom chamfer is completed with the first brush. At 508, the formation of the top chamfer is completed with the second brush. It should be noted that, in some embodiments, 502 and 504 may be carried out simultaneously, and 506 and 508 may be carried out simultaneously.

Figure 6:
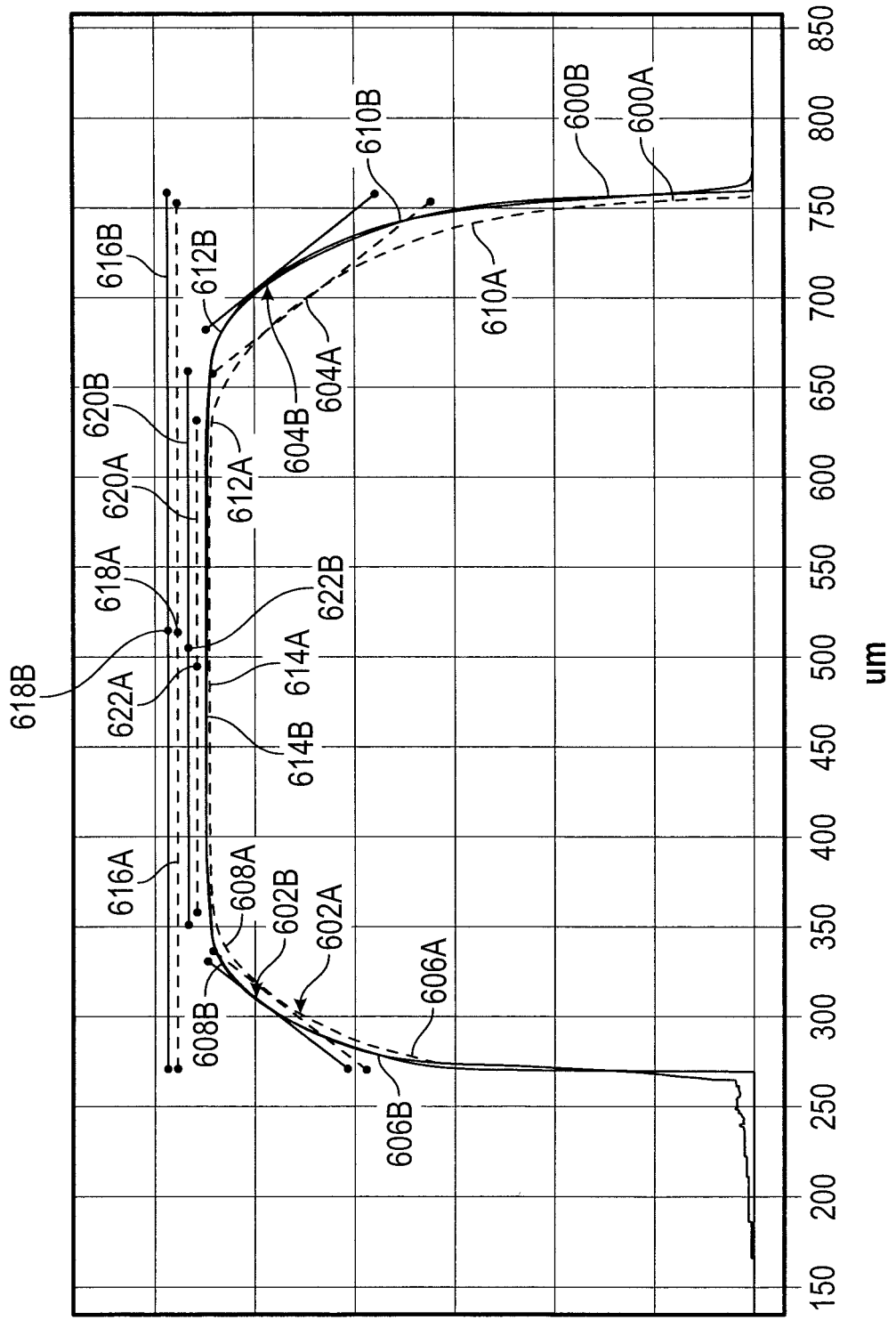
FIG. 6 is a diagrammatic illustration of disc portions with measurements illustrating a comparison of chamfer formation without and with disc substrate-spacer stack flipping midway through chamfer formation.

FIG. 6 is a diagrammatic illustration of disc portions 600A and 600B with measurements illustrating a comparison of chamfer formation without disc substrate-spacer stack flipping midway through chamfer formation in disc portion 600A, and with disc substrate-spacer stack flipping midway through chamfer formation in disc portion 600A. In FIG. 6, a horizontal (X) measurement axis represents distance in microns (um). In the description of FIG. 6, since the disc portion 600A, 600B is positioned vertically, the chamfers are present on left and right sides of the vertically positioned disc portion 600A, 600B. Therefore, based on position, the chamfers are referred to as left and right chamfers, but are equivalent to the top and bottom chamfers described earlier. Left chamfer 602A and right chamfer 604A are formed on disc portion 600A without flipping the disc substrate-spacer stack including disc portion 600A midway through chamfer formation. Left chamfer 602A has a first edge 606A and a second edge 608A, and right chamfer 604A has a first edge 610A and a second edge 612A. A flat outer edge 614A is between second edge 608A of left chamfer 602A and second edge 612A of right chamfer 604A. A thickness of disc portion 600A is denoted by reference numeral 616A, and a mid-point of the disc portion 600A thickness is denoted by reference numeral 618A. A thickness of flat outer edge 614A is denoted by reference numeral 620A, and a mid-point of the flat outer edge thickness is denoted by reference numeral 622A. A relatively large separation distance, px, between disc thickness mid-point 618A and outer edge thickness mid-point 622A is indicative of a substantial imbalance between chamfers 602A and 604A. Further, as can be seen in FIG. 6, left chamfer 602A is substantially smaller than right chamfer 604A.

Left chamfer 602B and right chamfer 604B are formed on disc portion 600B with flipping the disc substrate-spacer stack including disc portion 600B midway through chamfer formation. Left chamfer 602B has a first edge 606B and a second edge 608B, and right chamfer 604B has a first edge 610B and a second edge 612B. A flat outer edge 614B is between second edge 608B of left chamfer 602B and second edge 612B of right chamfer 604B. A thickness of disc portion 600B is denoted by reference numeral 616B, and a mid-point of the disc portion 600B thickness is denoted by reference numeral 618B. A thickness of flat outer edge 614B is denoted by reference numeral 620B, and a mid-point of the flat outer edge thickness is denoted by reference numeral 622B. A relatively small separation distance, px, between disc thickness mid-point 618B and outer edge thickness mid-point 622B is indicative of balance between chamfers 602B and 604B. Further, as can be seen in FIG. 6, left chamfer 602B is similar in size to right chamfer 604B.

A standard deviation measurement value for disc chamfer imbalance at different peripheral locations of a disc including disc portion 600A is also found to be larger (or substantially larger) than a standard deviation measurement value for disc chamfer imbalance at different peripheral locations of a disc including disc portion 600B.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   coupling a bottom end of a two-way pole with a plurality of disc substrates mounted thereon to a base connected to a substrate polishing machine;
   partially forming a top chamfer on each disc substrate of the plurality of disc substrates with a first brush of the substrate polishing machine;
   partially forming a bottom chamfer on each disc substrate of the plurality of disc substrates with a second brush of the substrate polishing machine; and
   after the top and bottom chamfers are partially formed, with positions of the first and second brushes remaining unchanged, disconnecting the bottom end of the two-way pole from the base, and connecting a top end of the two way pole to the base, thereby flipping the plurality of disc substrates and enabling the bottom chamfers to be completed by the first brush and the top chamfers to be completed by the second brush.

2. The method of claim 1 and further comprising:
   completing the formation of the bottom chamfers with the first brush; and
   completing the formation of the top chamfers with the second brush,
   wherein the formation and the top chamfers and the bottom chamfers is carried out simultaneously.

3. The method of claim 1 and wherein the partial formation of the top and bottom chamfers is carried out during a first time period, and wherein the completion of the formation of the top and bottom chamfers is carried out during a second time period, and wherein the first time period is equal to the second time period.

4. The method of claim 1 and further comprising rotating the first and second brushes such that bristles of the first and second brushes form the top and bottom chamfers.

5. The method of claim 1 and further comprising separating individual disc substrates of the plurality of disc substrates from one another with spacers.

6. The method of claim 1 and wherein each disc substrate of the plurality of disc substrates is formed of glass.

7. The method of claim 1 and further comprising:
   providing the top and bottom ends of the two-way pole with holes; and
   providing the base with a plurality of pins that are insertable into the holes, thereby enabling the connecting and disconnecting.

8. A method comprising:
   partially forming a top chamfer on a disc substrate with a first brush;
   partially forming a bottom chamfer on the disc substrate with a second brush;
   completing the formation of the bottom chamfer with the first brush; and
   completing the formation of the top chamfer with the second brush.

9. The method of claim 8 and further comprising:
   prior to partially forming the top and bottom chamfers, coupling a bottom end of a two-way pole with the disc substrate mounted thereon to a base connected to a substrate polishing machine that comprises the first and second brushes.

10. The method of claim 9 and further comprising:
    prior to completing the formation of the top and bottom chamfers, disconnecting the bottom end of the two-way pole from the base, and connecting a top end of the two way pole to the base, thereby flipping the disc substrate.

11. The method of claim 10 and further comprising:
    providing the top and bottom ends of the two-way pole with holes; and
    providing the base with a plurality of pins that are insertable into the holes, thereby enabling the connecting and disconnecting.

12. The method of claim 8 and wherein the partial formation of the top and bottom chamfers is carried out during a first time period, and wherein the completion of the formation of the top and bottom chamfers is carried out during a second time period, and wherein the first time period is equal to the second time period.

13. The method of claim 8 and wherein the disc substrate is formed of glass.

14. The method of claim 8 and wherein the formation of the top and bottom chamfers is carried out simultaneously.

\* \* \* \* \*